(No Model.)
E. H. FARMER.
GANG PLOW ATTACHMENT.
No. 401,937. Patented Apr. 23, 1889.
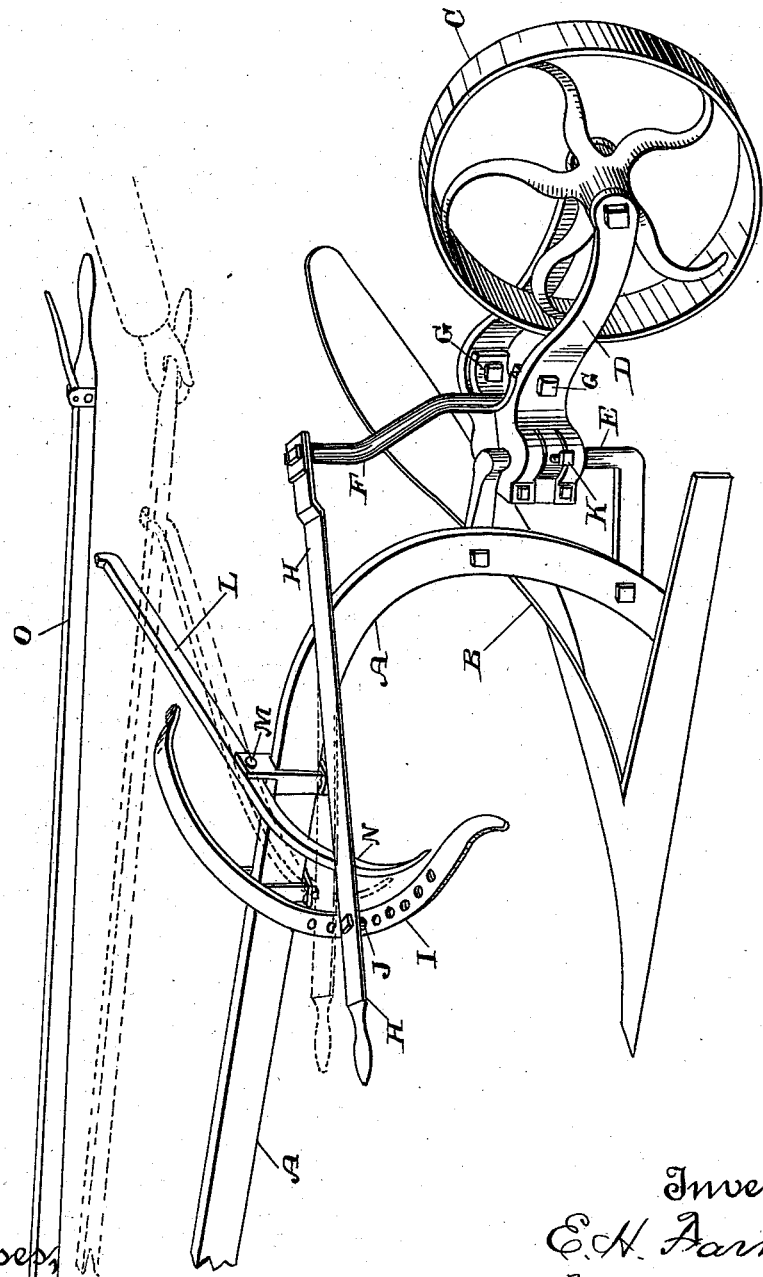

UNITED STATES PATENT OFFICE.

EDWARD H. FARMER, OF GILROY, CALIFORNIA.

GANG-PLOW ATTACHMENT.

SPECIFICATION forming part of Letters Patent No. 401,937, dated April 23, 1889.

Application filed January 11, 1889. Serial No. 296,093. (No model.)

*To all whom it may concern:*

Be it known that I, EDWARD H. FARMER, of Gilroy, Santa Clara county, State of California, have invented an Improvement in Gang-Plow Attachments; and I hereby declare the following to be a full, clear, and exact description of the same.

My invention relates to an attachment for gang-plows; and it consists in the constructions and combinations of devices, which I shall hereinafter fully describe and claim.

Referring to the accompanying drawing for a more complete explanation of my invention, the figure represents the rear portion of a gang-plow frame, showing one of the plows, also the rear end of the lever by which the plows are raised out of the ground, and the trailing wheel with my attachment.

A is the rear portion of the frame of a gang-plow having any desired number of plows attached thereto, of which one is shown at B. My attachment is shown as applied to what is known as the "walking gang-plow," having a pair of wheels which support the front end of the frame, (not shown in the present drawing,) and a trailing wheel, C, journaled in a fork, D, the front end of which fork has a vertical hole made through it, so that it may swivel upon the vertical shaft or post E. The upper and lower ends of this post have arms which are securely bolted to the rear end of the plow-beam A, thus holding the vertical post rigidly in place, and the wheel and its frame are ordinarily allowed to turn or swivel loosely, so that while supporting the rear end of the plow-frame this wheel is allowed to turn freely when it is desired to turn the plows around.

My invention consists of a means for temporarily fixing this wheel at any desired angle with the line of travel of the plows.

F is a standard the lower end of which is firmly secured within the fork D of the swivel-wheel C by bolts, as shown at G. The upper end of this standard is bent, so that it extends in line above the post E, and upon the upper end of the standard F is fixed the lever-arm H, which projects forward and rests upon the top of the curved rack-bar I, which is secured horizontally upon the top of the beam A, so as to extend transversely across it to each side. This rack-bar is secured by means of a clamp, with bolts, or in any other suitable manner, so as to be held firmly in place. In the present case I have shown it represented as a flat bar having holes made through it, and the lever H has a pin, J, projecting downward, so as to correspond with these holes and fall into any one which may be desired. By this arrangement it will be manifest that by turning the lever H to one side it will act through the vertical standard F to turn the fork D and the steering-wheel C, so that the whole will stand at an angle with the line of travel of the plows, and it will be held at the particular angle by means of the bolt J dropping into one of the holes in the rack-bar I. It will be manifest that this result might be obtained by the employment of a set-screw, as shown at K, whereby the sleeve of the fork D, which turns upon the post E, could be secured thereto temporarily; but this will be inconvenient, because it will be necessary to release the screw at the end of every furrow, or at the point where the plow would have to turn from a straight line, and I therefore prefer the arrangement previously described. In order to release this lever H whenever the plows are to be turned, I have shown a lever-arm, L, extending transversely across the plow-beam A and fulcrumed, as shown at M, so that it may be easily moved up or down. The outer end of the lever-arm extends beneath the lever H, as shown at N, and the opposite end of the arm extends beneath the lever O. This lever O is the one ordinarily used upon this class of plows, and it extends forward and connects with the usual mechanism by which the plows are raised out of the ground when the end of a furrow is reached or whenever it is desired to turn the plows around. The plows are raised out of the ground by simply depressing the lever O, which is done by the operator walking behind the plows, as shown in the dotted lines. This lever O then coming in contact with the transverse lever L depresses it, and raising the outer end raises the lever H, so as to disengage the point J from the rack I, when the swivel-wheel C will be left free to turn in the usual manner and without hinderance, so that it may take any angle with the plow-frame while the latter is being turned around.

This device is especially useful as an attachment for gang-plows when plowing upon side hills, because by setting the wheel C so as to travel at an angle with the line of travel of the plows it acts to force the plows toward the land and counteract the tendency to slide down the hill and away from the land which is being plowed. This tendency is so great that ordinary gang-plows could not be used to do this class of work.

Having thus described my invention, what I claim as new, and desire to secure by Letters Patent, is—

1. The combination, in a gang-plow having a swivel rear wheel, of the fork D, the post E, secured to the plow-beam and forming the axis about which the fork turns, the standard F, secured to the fork and connected with the lever N, and the holding-rack, substantially as described.

2. The combination, with a gang-plow and the rear swivel-wheel thereof, of a mechanism whereby the swivel-wheel may be temporarily locked and prevented from turning and released so as to turn freely, and a lever for tripping the locking devices, substantially as described.

3. A gang of plows having the rear wheel swiveled thereto, a lever connected with a swivel-wheel frame, and a rack and locking mechanism for arresting the motion of the swivel-wheel, in combination with a second lever fulcrumed upon the plow-beam, one end extending beneath the swivel-wheel lever and the other beneath the lever O, so as to be actuated thereby, substantially as described.

In witness whereof I have hereunto set my hand.

EDWARD H. FARMER.

Witnesses:
JAS. C. ZUCK,
JOHN S. FITZGERALD.